US006690143B2

(12) United States Patent
Lin et al.

(10) Patent No.: US 6,690,143 B2
(45) Date of Patent: Feb. 10, 2004

(54) POWER FACTOR CORRECTION CIRCUIT WITH RESONANT SNUBBER

(75) Inventors: Pao-Chuan Lin, Jubei (TW); Chun-Hsien Lee, Changhua (TW); Chih-Hsin Chen, Hsinchu (TW); Chung-Shing Tzou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/197,846

(22) Filed: Jul. 19, 2002

(65) Prior Publication Data

US 2003/0107354 A1 Jun. 12, 2003

(30) Foreign Application Priority Data

Dec. 10, 2001 (TW) ........................................ 90130478 A

(51) Int. Cl.⁷ ................................................. G05F 1/10
(52) U.S. Cl. ........................ 323/222; 323/207; 323/208; 361/18; 361/91.7
(58) Field of Search ................................ 323/222, 235, 323/207, 208, 209, 210; 361/18, 91.7

(56) References Cited

U.S. PATENT DOCUMENTS 6,236,191 B1 * 5/2001 Chaffai ........................ 323/225
6,525,513 B1 * 2/2003 Zhao ............................ 323/222

\* cited by examiner

*Primary Examiner*—Shawn Riley
(74) *Attorney, Agent, or Firm*—Intellectual Property Solutions, Incorporated

(57) ABSTRACT

A power factor correction (PFC) circuit with a resonant snubber. The power factor correction (PFC) circuit has an input part (601) for receiving an AC voltage and outputting a first DC voltage; a main part (604) for converting the first DC voltage to a second DC voltage; and a snubber (500) for ensuring the main part operates in soft turn-on and soft turn-off. The main part (604) has a primary inductor and a primary diode connected in series, and a switch (606) connected to the connection node of the primary inductor and the primary diode. The snubber (500) has a cascaded device (a first diode and a resonant inductor connected in series) and a second diode connected in series, and a resonant capacitor connected between the connection node of the cascaded device and second diode, and the switch (606).

6 Claims, 7 Drawing Sheets

POWER FACTOR CORRECTION CIRCUIT WITH RESONANT SNUBBER

BACKGROUND OF THE INVENTION

1. Field of the Invention

This invention relates to a power factor correction circuit with a snubber, which uses a resonant inductor, a resonant capacitor and two forward-biased diodes to form a passive snubber thereby increasing utility efficiency, decreasing switching loss and keeping voltage and current in phase.

2. Description of the Related Art

The same element function denotes the same reference number throughout the specification.

FIG. 1 shows a typical power factor correction circuit (hereinafter is referred to as PFC circuit). In FIG. 1, the PFC circuit comprises an input part 101 and a main part 104. The input part 101 such as a bridge rectifier receives an AC voltage and outputs an uncontrolled DC voltage. The main part 104 such as a boost converter regulates the uncontrolled DC voltage and outputs a stable DC voltage to the load 105. The main part 104 comprises a switch 106 such as MOSFET having a parasitic diode 110a and capacitor 110b connected in parallel therewith, an inductor 107, a diode 108, and an energy storage capacitor 109. The load 105 means any possible apparatus or device which receives the DC voltage from the PFC circuit to operate. The load 105 may be indicated by the equivalent resistance 'R' of the apparatus or device, for brevity.

It is well known that the main part 104 can operate in three modes: (1) continuous conduction mode (C.C.M), (2) discontinuous conduction mode (D.C.M), and (3) boundary mode (B.M). Generally, the main part 104 operates in the C.C.M and the switch 106 turns on and off periodically in high frequency (usually 50~200 KHz). FIG. 2 shows the voltage (Vd) and current (Id) waveforms of a MOSFET serving as the switch 106 in FIG. 1. It is clear that the switch 106 (MOSFET) cannot turns on under zero voltage (or turns off under zero current), and therefore large switching loss is induced. Several way were proposed to reduce the switching loss. One is to make the main part 104 operate in the D.C.M or B.M. to minimize the turn-on or turn-off loss of the switch 106. Additional active switch such as active snubber is required to reduce the switching loss. However, adding another active switch is not permitted for cost consideration.

FIG. 3 is a typical PFC circuit with a passive snubber. Compared to FIG. 1, a snubber 200 is added to the main part 104, and connected in parallel with the diode 108. Referring to FIG. 3, the snubber 200 comprises two capacitors 201 and 203, two diodes 204 and 205, and an inductor 202 which is connected between the cathode of the diode 204 and the anode of the diode 205, wherein the anode of the diode 204 and the cathode of the diode 205 are respectively connected to the anode and cathode of the diode 108.

Referring to FIG. 3, when the switch 106 is turn-on, the voltage (or charge) stored in the energy storage capacitor 109 charges the capacitors 203 and 201. When the switch 106 is turn-off, the voltage (or charge) stored in the capacitors 203 and 201 is discharged to the energy storage capacitor 109. The voltage increasing rate across the switch 106 while turning off depends on the discharge rate of the capacitors 203 and 201. As such, the voltage across the switch 106 will increase slowly rather than suddenly become large during its transition from turn-on to turn-off. Consequently, the turn-off switching loss is less than that described in FIG. 1. FIG. 4 shows the voltage (Vd) and current (Id) waveforms of a MOSFET serving as the switch 106 in FIG. 3. During each of the time interval Td in FIG. 4, it is clear that the switch 106 carries out turn-off operation and almost generates no switching loss.

However, the snubber 200 is charged by the energy storage capacitor 109 and discharged (pumped) to the same, and the charging and pumping currents from and to the energy storage capacitor 109 always cause more conduction loss.

SUMMARY OF THE INVENTION

Therefore, an object of the invention is to provide a PFC circuit with a passive snubber, which uses a resonant capacitor in conjunction with a resonant inductor and two diodes to make the voltage across the switch increase slowly when the switch becomes turn-off from a turn-on state so as to reduce the switch loss, increase power utility efficiency and keep voltage and current in phase.

To realize the above and other objects, the invention provides a PFC circuit with a passive snubber. The PFC circuit comprises: an input part with two output terminal for receiving a AC voltage and outputting a first DC voltage; and a main part for converting the first DC voltage to a second DC voltage, comprising a primary inductor with one terminal connected to one output terminal of the input part, a switch connected between the other terminal of the primary inductor and the other output terminal of the input part, a primary diode with an anode connected to the other terminal of the primary inductor, and an energy storage capacitor connected between a cathode of the primary diode and the other output terminal of the input part; and a snubber for ensuring the switch to operate in soft turn-on and soft turn-off, comprising a cascaded device with one terminal coupled to the output terminal of the input part which at least is composed of a first diode and a resonant inductor, a second diode connected between the other terminal of the cascaded device and the cathode of the primary diode, and a resonant capacitor connected between the anode of the second diode and the anode of the primary diode.

BRIEF DESCRIPTION OF THE DRAWINGS

The invention will become apparent by referring to the following detailed description of a preferred embodiment with reference to the accompanying drawings, wherein.

DETAILED DESCRIPTION OF THE INVENTION

Figure 5:
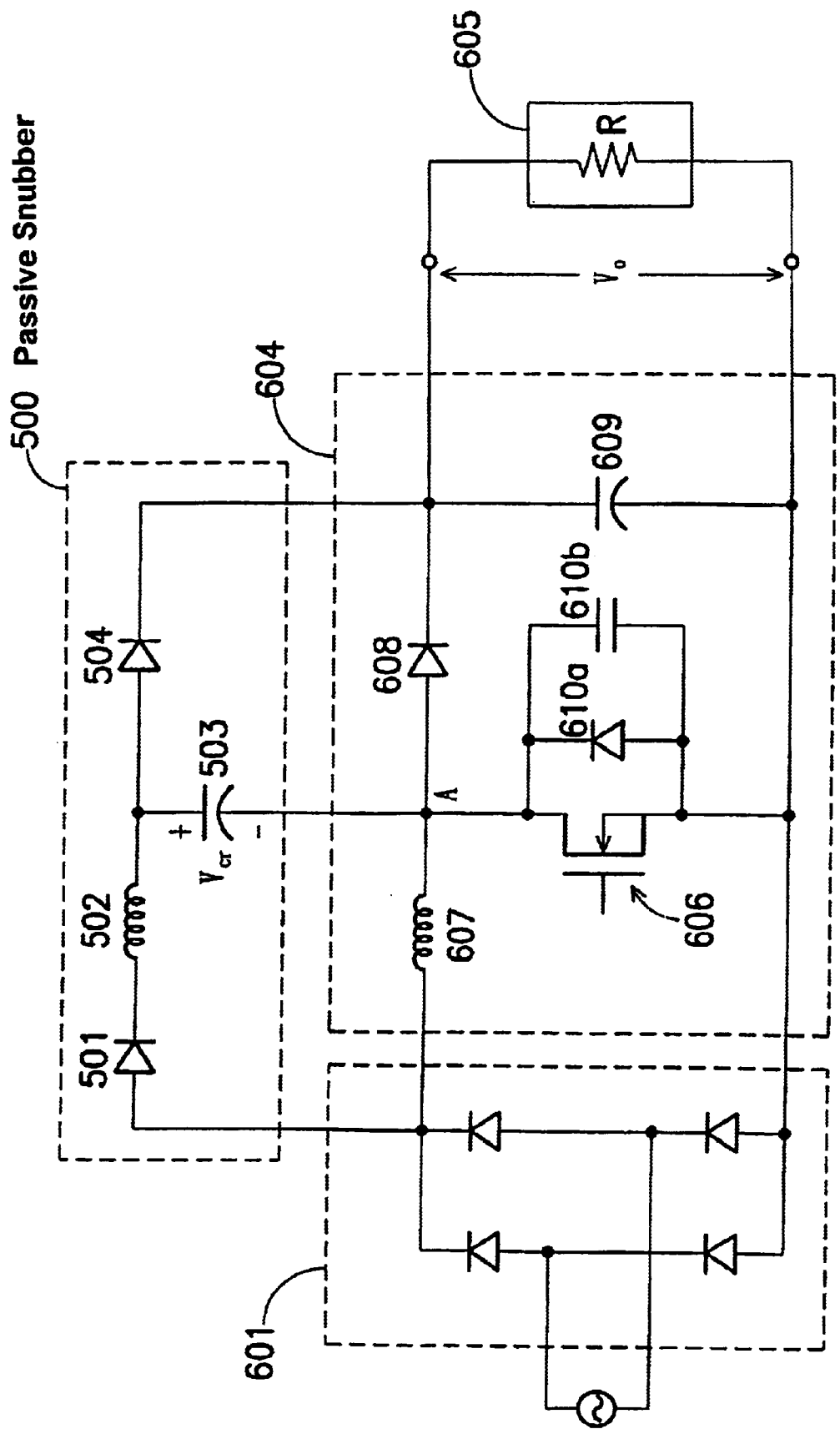
FIG. 5 is a diagram of an inventive PFC circuit with a passive snubber.

FIG. 5 is a diagram of an inventive PFC circuit with a passive snubber 500. In FIG. 5, the PFC circuit comprises an input part 601, a main part 604, and a passive snubber 500.

The input part 601 such as a bridge rectifier receives an AC voltage and outputs an uncontrolled DC voltage. The main part 604 such as a boost converter regulates the uncontrolled DC voltage and outputs a stable DC voltage to the load 605. The main part 604 comprises a switch 606 (such as a MOSFET transistor) having a parasitic diode 610*a* and capacitor 610*b* connected in parallel therewith, a primary inductor 607, a primary diode 608, and an energy storage capacitor 609. The load 605 means any possible apparatus or device which receives the DC voltage from the PFC circuit in order to operate. The load 605 may be indicated by the equivalent resistance 'R' of the apparatus or device, for brevity.

Referring to FIG. 5, the passive snubber 500 comprises a first diode 501, a resonant inductor 502, a second diode 504, and a resonant capacitor 503. The first diode 501, resonant inductor 502, and second diode 504 are connected in series. The anode of the first diode 501 is connected to one terminal of the primary inductor 607, and the cathode of the second diode 504 is connected to the cathode of the primary diode 608. The capacitor 503 is connected between the anode of the second diode 504 and the other terminal of the primary inductor 607 (or the anode of the primary diode 608).

Figure 7:
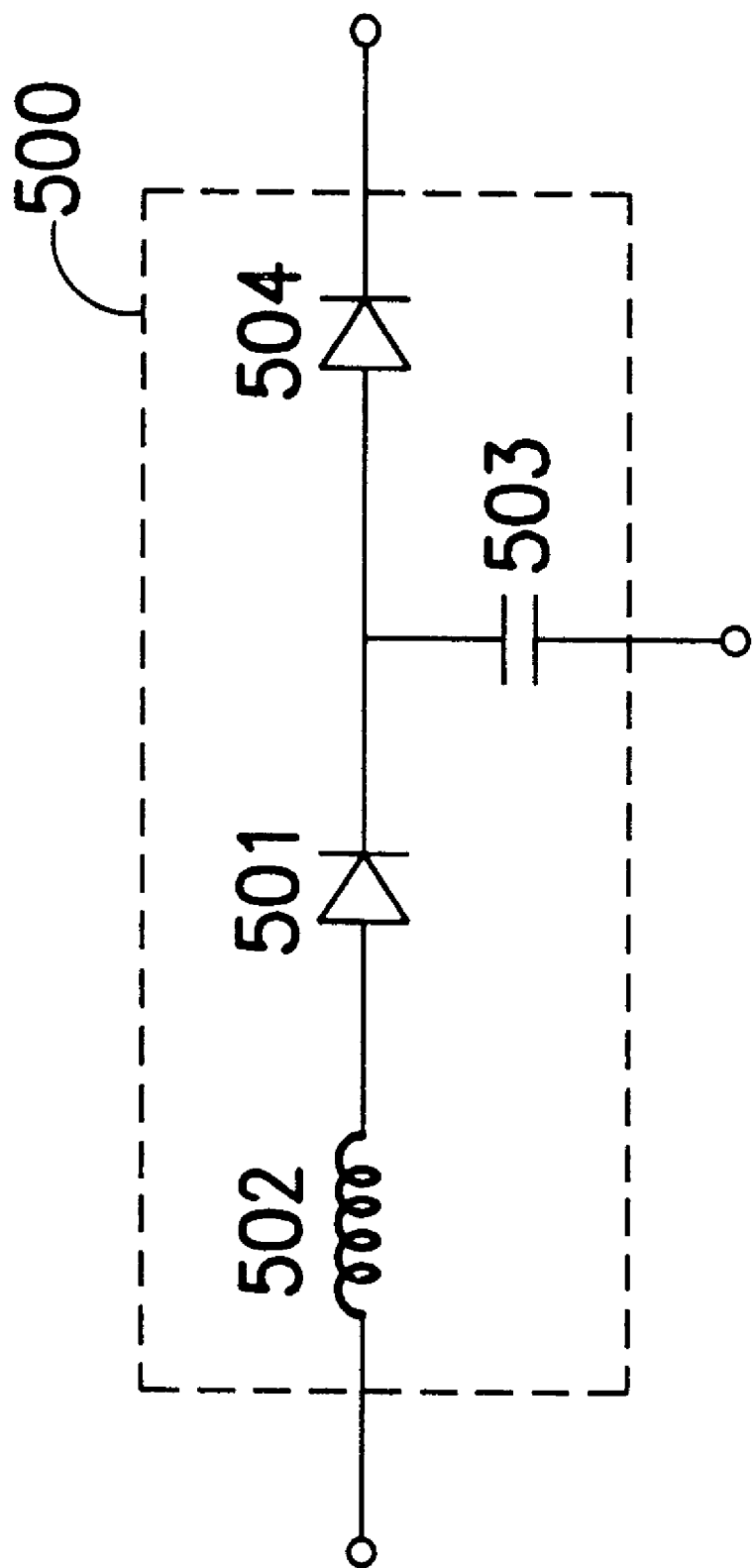
FIG. 7 shows another possible connection of the first diode and the resonant inductor.

It is noted that the connection of the first diode 501 and the resonant inductor 502 in FIG. 5 can be changed as shown in FIG. 7.

Referring to FIG. 5, when the switch 606 becomes turn-on, both the currents flowing through the primary inductor 607 and the resonant inductor 502 increase. If the PFC circuit operates in D.C.M or B.M, the current of the primary inductor 607 increases from zero. As well, the resonant inductor 502 and the resonant capacitor 503 will resonate. When the voltage ($V_{cr}$) across the resonant capacitor 503 increases to the same level as the voltage ($V_o$) across the energy storage capacitor 609, the second diode 504 becomes turn-on and then the current of the resonant inductor 502 will gradually decrease to zero. Therefore, the first and second diodes 501 and 504 operate in soft turn-off. Moreover, the first diode also operates in soft turn-on, because the current flowing through the first diode 501 gradually increases from zero when the switch 606 turns on.

Referring to FIG. 5, when the switch 606 becomes turn-off, the charge (or voltage) stored in the resonant capacitor 503 must discharge first and therefore the current flowing through the primary inductor 607 will not flow into the primary diode 608 immediately. The resonant capacitor 503 will carry out discharge to the energy storage capacitor 609. The voltage variation (ΔV) of the resonant capacitor 503 is expressed as the equation:

$$\Delta V = \frac{I \times \Delta T}{C} \quad (F1)$$

wherein the notation 'I' means the current flowing through the primary inductor 607 when the switch 606 turns off, the notation 'C' means the capacitance of the resonant capacitor 503, and the notation 'ΔT' means the discharge time duration. According to the equation F1, it is obvious that the voltage ($V_{cr}$) of the resonant capacitor 503 will decrease gradually in proportion to the time duration ΔT.

Figure 1:
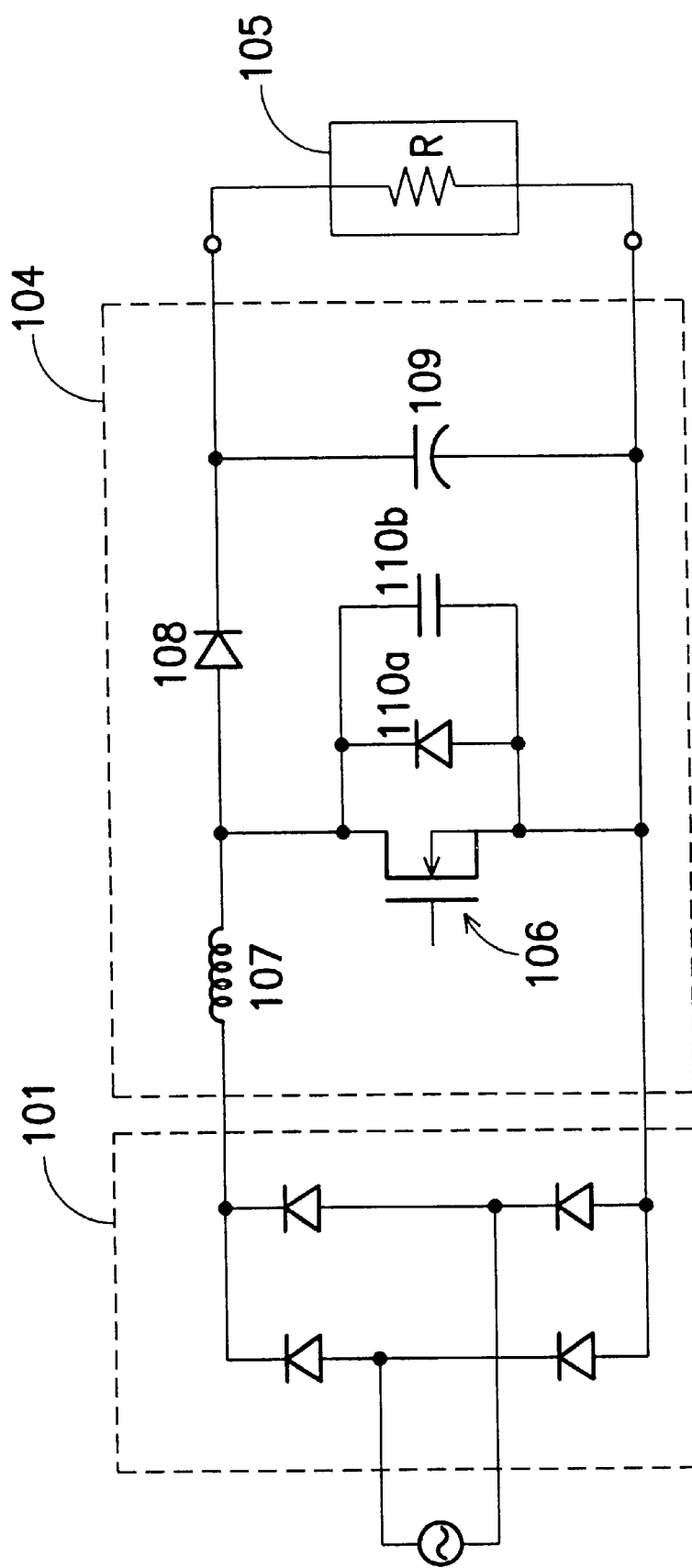
FIG. 1 is a schematic diagram of a typical PFC circuit.
Figure 2:
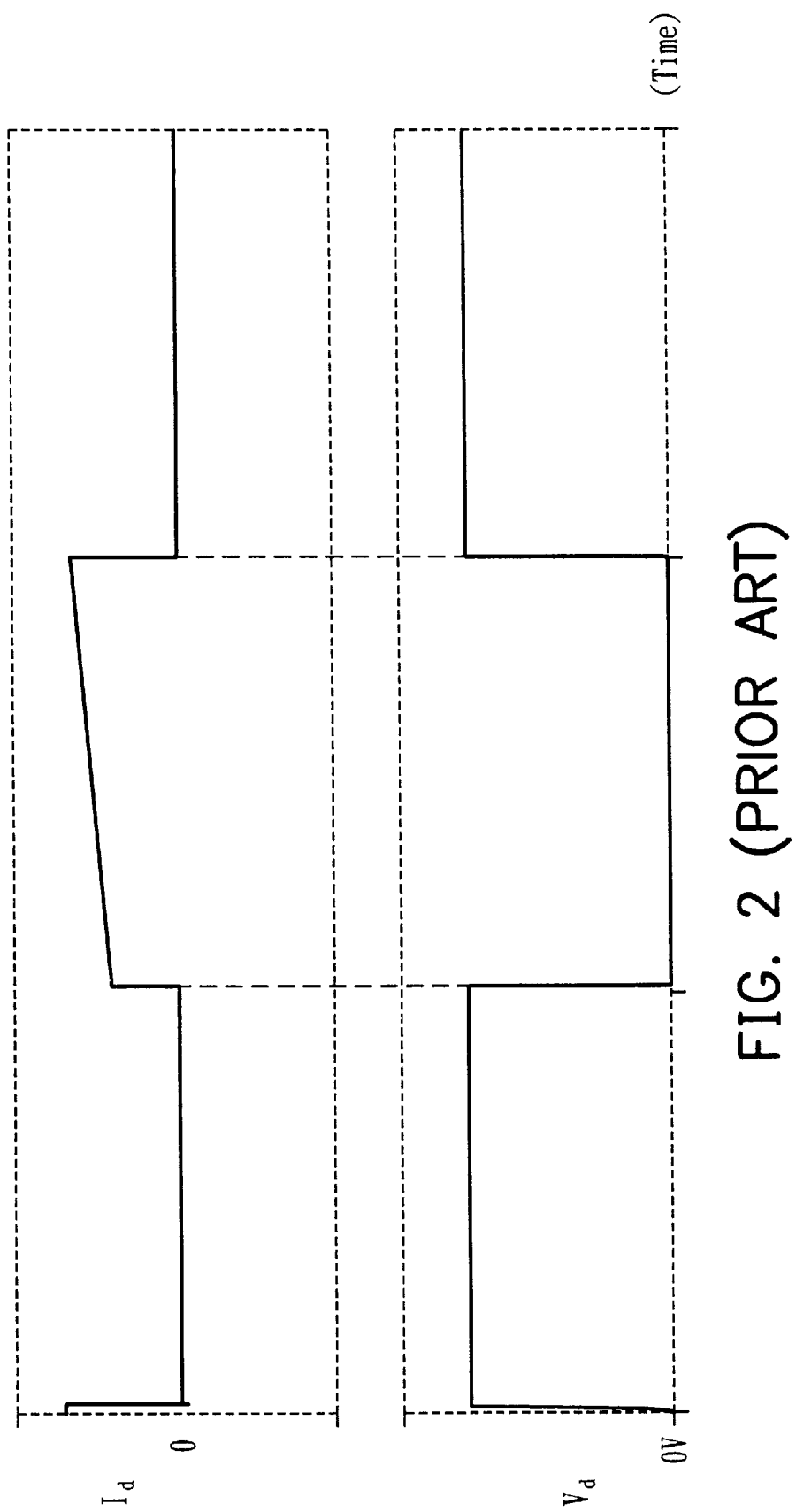
FIG. 2 is a voltage-to-current curve diagram of the switch of FIG. 1.
Figure 3:
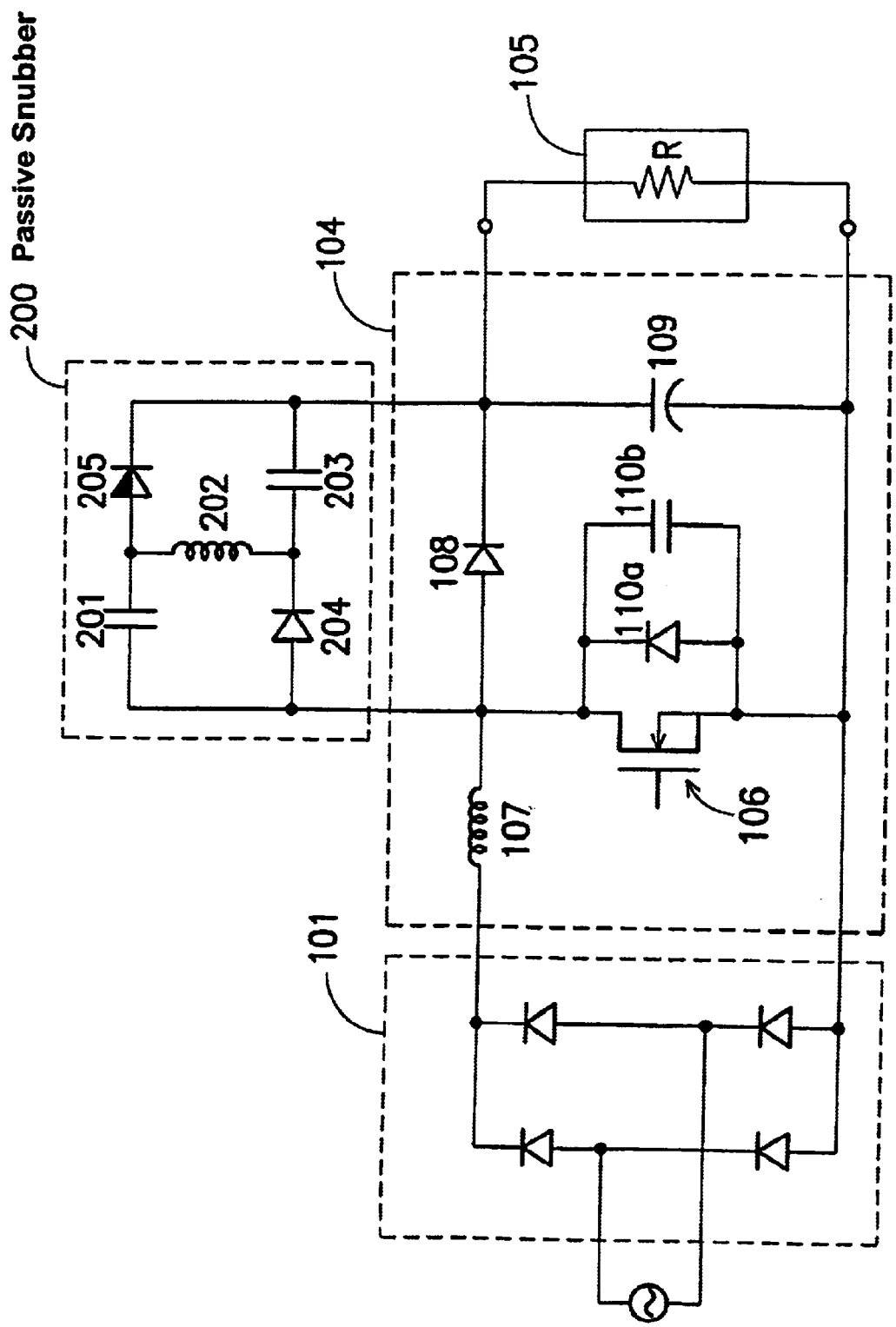
FIG. 3 is a schematic diagram of a typical PFC circuit with a snubber.
Figure 4:
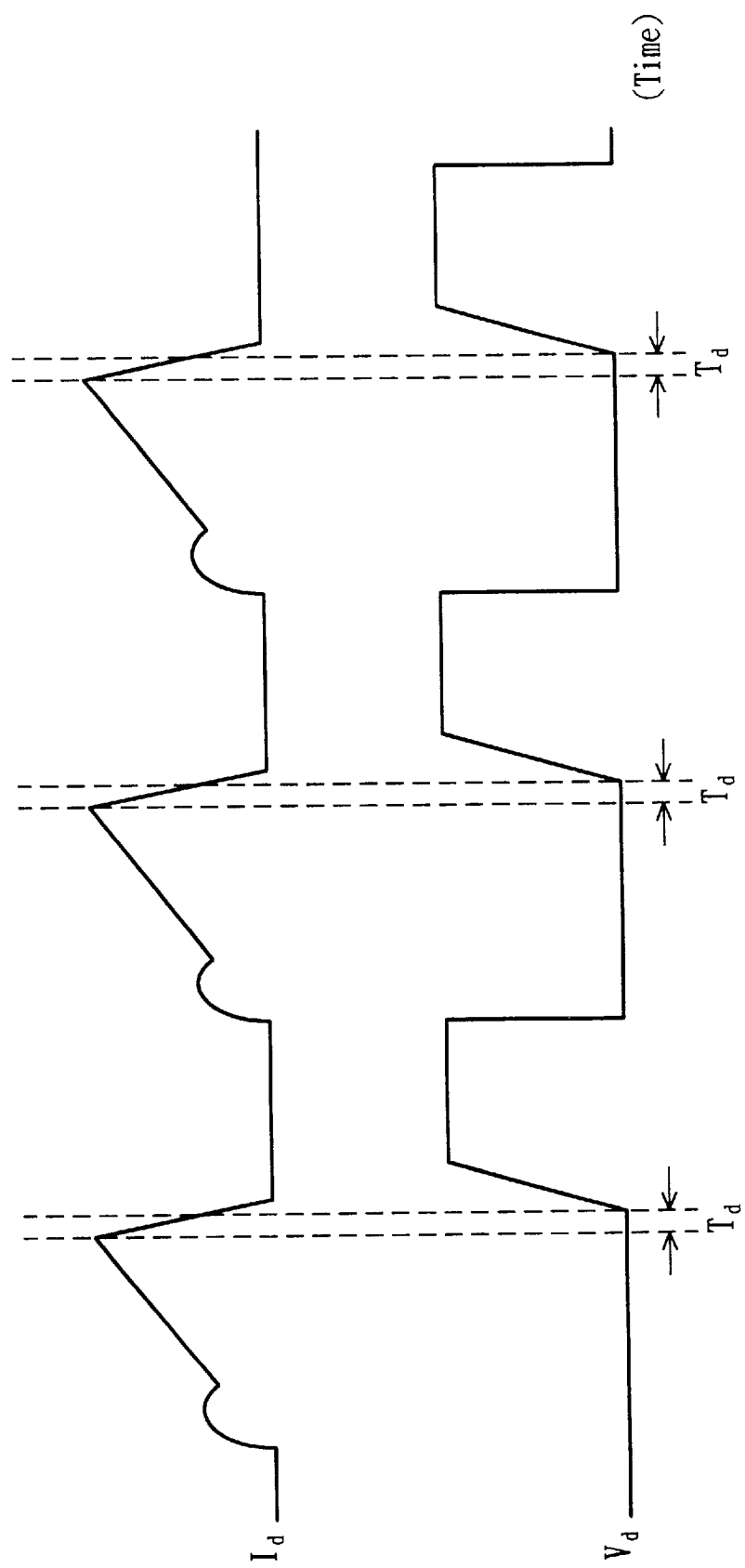
FIG. 4 is a voltage-to-current curve diagram of the switch of FIG. 3.

When the switch 606 turns off, the voltage ($V_A$) at node A (FIG. 5) equals the voltage of $V_o$-$V_{cr}$. The voltage ($V_A$) at node A is limited to increase slowly (slower than the situation described in FIG. 1), that is, the voltage across the switch 606 will not suddenly increases to a large level. Consequently, the switch 606 operates in soft turn-off.

Additionally, when the PFC circuit operates in D.C.M, the switch 606 will not turn on until the current of the primary inductor 607 becomes zero. Therefore, the switch 606 also operates in soft turn-on.

Figure 6:
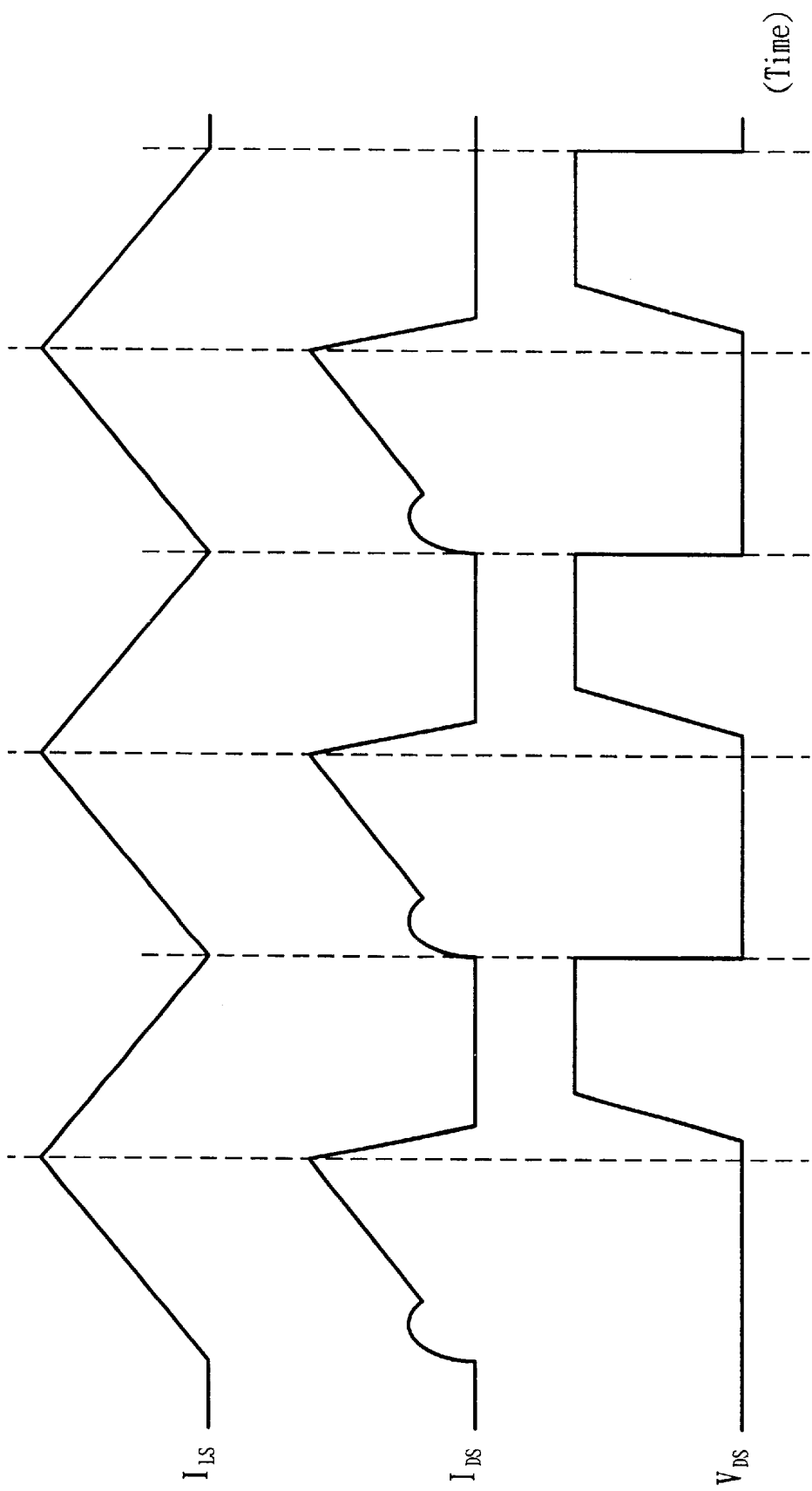
FIG. 6 is a voltage-to-current curve diagram of the switch of FIG. 5.

FIG. 6 shows the current waveforms ($I_{LS}$, $I_{DS}$) of the primary inductor 607 and the switch 606, and the voltage waveform ($V_{DS}$) across the switch 606. It is clear that the switch actually operates in soft turn-on and soft turn-off, thus reducing the switching loss.

Although the invention has been described in its preferred embodiment, it is not intended to limit the invention to the precise embodiment disclosed herein. Those who are skilled in this technology can still make various alterations and modifications without departing from the scope and spirit of this invention. Therefore, the scope of the invention shall be defined and protected by the following claims and their equivalents.

What is claimed is:

1. A power factor correction (PFC) circuit with a snubber, comprising:

an input part with two output terminals for receiving an AC voltage and outputting a first DC voltage;

a main part for converting the first DC voltage to a second DC voltage, comprising a primary inductor with one terminal connected to one output terminal of the input part, a switch connected between the other terminal of the primary inductor and the other output terminal of the input part, a primary diode with an anode connected to the other terminal of the primary inductor, and an energy storage capacitor connected between a cathode of the primary diode and the other output terminal of the input part; and a snubber for ensuring the switch to operate in soft turn-on and soft turn-off, comprising a cascaded device with one terminal coupled to the output terminal of the input part which at least is composed of a first diode and a resonant inductor, a second diode connected between the other terminal of the cascaded device and the cathode of the primary diode, and a resonant capacitor connected between the anode of the second diode and the anode of the primary diode.

2. The PFC circuit with a snubber of claim 1, wherein the control switch is a transistor.

3. The PFC circuit with a snubber of claim 1, wherein the control switch is an MOSFET.

4. The PFC circuit with a snubber of claim 1, wherein the cathode of the first diode is connected to the resonant inductor.

5. The PFC circuit with a snubber of claim 1, wherein the anode of the first diode is connected to the resonant inductor.

6. The PFC circuit with a snubber of claim 1, wherein the input part is a bridge rectifier.

* * * * *